United States Patent
Bates et al.

(10) Patent No.: US 9,183,851 B2
(45) Date of Patent: Nov. 10, 2015

(54) LOCATING DATA STORED ON A MAGNETIC MEDIUM

(71) Applicant: International Business Machines Corporation, Armonk, NY (US)

(72) Inventors: Allen K. Bates, Tucson, AZ (US); Nhan X. Bui, Tucson, AZ (US); Daniel J. Winarski, Tucson, AZ (US)

(73) Assignee: GLOBALGOUNDRIES U.S. 2 LLC, Hopewell Junction, NY (US)

( * ) Notice: Subject to any disclaimer, the term of this patent is extended or adjusted under 35 U.S.C. 154(b) by 88 days.

(21) Appl. No.: 14/049,278

(22) Filed: Oct. 9, 2013

(65) Prior Publication Data

US 2015/0098149 A1 Apr. 9, 2015

(51) Int. Cl.
G11B 15/18 (2006.01)
G11B 5/00 (2006.01)
G11B 27/11 (2006.01)
G11B 27/30 (2006.01)

(52) U.S. Cl.
CPC *G11B 5/00* (2013.01); *G11B 27/11* (2013.01); *G11B 27/3027* (2013.01); *G11B 2220/63* (2013.01); *G11B 2220/93* (2013.01)

(58) Field of Classification Search
None
See application file for complete search history.

(56) References Cited

U.S. PATENT DOCUMENTS

| | | | |
|---|---|---|---|
| 5,689,384 A | 11/1997 | Albrecht et al. | |
| 6,018,434 A | 1/2000 | Saliba | |
| 6,021,013 A | 2/2000 | Albrecht et al. | |
| 6,038,106 A * | 3/2000 | Aboaf et al. | 360/317 |
| 6,304,416 B1 | 10/2001 | McAllister et al. | |
| 6,775,092 B2 | 8/2004 | Zweighaft et al. | |
| 6,963,467 B2 | 11/2005 | Bui et al. | |
| 7,428,118 B2 | 9/2008 | Duran | |
| 8,059,362 B2 | 11/2011 | Hancock et al. | |
| 8,228,635 B2 | 7/2012 | Argumedo et al. | |
| 2012/0008232 A1* | 1/2012 | Fasen | 360/75 |
| 2012/0307390 A1 | 12/2012 | Bui et al. | |

OTHER PUBLICATIONS

Angeliki Pantazi, "Track-Follow Control for Tape Storage," Workshop on Dynamics and Control of Micro and Nanoscale Systems, IBM Research—Zurich, Dec. 10-11, 2009.

* cited by examiner

*Primary Examiner* — Andrew L Sniezek
(74) *Attorney, Agent, or Firm* — Scully, Scott, Murphy & Presser, P.C.

(57) ABSTRACT

A set of lateral positions, of the magnetic medium with respect to the tape reel and a set of longitudinal positions of the magnetic medium with respect to the beginning of the magnetic medium as the magnetic medium comes off the first tape reel, are identified. A record is stored, on a non-volatile storage medium, of the set of lateral positions of the magnetic medium and the set of longitudinal positions of the magnetic medium. The record, of the set of lateral positions of the magnetic medium and the set of longitudinal positions of the magnetic medium as the magnetic medium comes off a second tape reel, is read. A tape head is moved laterally, to the lateral positions in response to the reading of the record of the set of lateral positions of the magnetic medium and the set of longitudinal positions of the magnetic medium.

19 Claims, 5 Drawing Sheets

LOCATING DATA STORED ON A MAGNETIC MEDIUM

FIELD OF INVENTION

This disclosure relates generally to lateral tape motion in a magnetic medium, and more specifically, moving a tape head in response to stack jumps of a magnetic medium during read operations.

BACKGROUND

Nearly all digital data is stored on magnetic media. Magnetic media includes magnetic tape, hard drives, and floppy disks. Magnetic tape is a medium for magnetic recording, made of a thin layer of magnetizable nanoparticles coated onto one side of a long, narrow substrate of BoPET (Biaxially-oriented polyethylene terephthalate), which is a polyester film made from stretched polyethylene terephthalate (PET), which has the common trade name of MYLAR.

SUMMARY

Disclosed herein are embodiments of a method for locating data stored on a magnetic medium that has a beginning longitudinal position with respect to a beginning of the magnetic medium and a lateral position with respect to a first tape reel. In an embodiment, the method may include reading a set of lateral positions of the magnetic medium with respect to the tape reel and a concurrent set of longitudinal positions of the magnetic medium with respect to the beginning of the magnetic medium as the magnetic medium comes off the first tape reel. In addition, the method may include storing a record, on a non-volatile storage medium, of the set of lateral positions of the magnetic medium and the concurrent set of longitudinal positions of the magnetic medium. The method may also include, reading the record of the set of lateral positions of the magnetic medium and the set of concurrent longitudinal positions of the magnetic medium as the magnetic medium comes off a second tape reel. Furthermore, the method may include, moving a tape head laterally to the lateral positions in response to the reading of the record of the set of lateral positions of the magnetic medium and the set of concurrent longitudinal positions of the magnetic medium.

Also disclosed herein are embodiments of a system of locating data stored on a magnetic medium that has a beginning longitudinal position with respect to a beginning of the magnetic medium and a lateral position with respect to a first tape reel. In an embodiment, the system may include a recording tool configured to read a set of lateral positions of the magnetic medium with respect to the tape reel and a concurrent set of longitudinal positions of the magnetic medium with respect to the beginning of the magnetic medium as the magnetic medium comes off the first tape reel. In addition, the system may include a non-volatile storage medium configured to store a record of the set of lateral positions of the magnetic medium and the concurrent set of longitudinal positions of the magnetic medium. The system may also include a controller configured to read the record of the set of lateral positions of the magnetic medium and the set of concurrent longitudinal positions of the magnetic medium as the magnetic medium comes off a second tape reel. The controller may be further configured to move a tape head laterally to the lateral positions in response to the reading of the record of the set of lateral positions of the magnetic medium and the set of concurrent longitudinal positions of the magnetic medium.

Also disclosed herein are embodiments of a device for storing a record of lateral shifts of a magnetic medium. In an embodiment, the device may comprise the magnetic medium, a non-volatile storage medium, a tape reel, and a tape reel cartridge.

DETAILED DESCRIPTION

Figure 1:
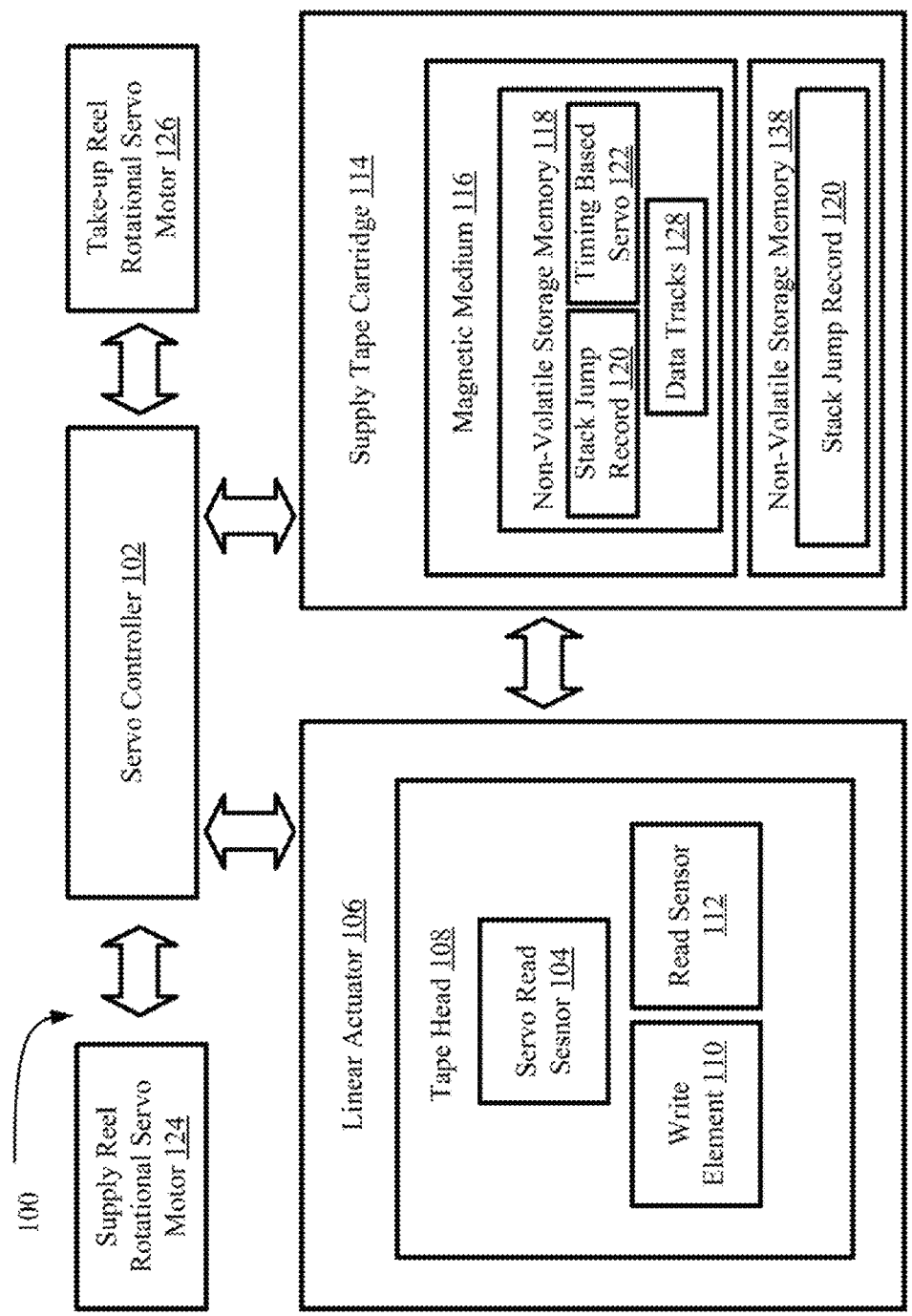
FIG. 1 depicts a system for locating data stored on a magnetic medium, consistent with embodiments of the present disclosure.

Storing data on a magnetic medium such as a magnetic tape requires a write element and read sensor that make up a tape head to be in close proximity of the moving magnetic medium. The write element is driven by a current source that carries the information to be stored. The write element radiates flux and when a piece of magnetic material is moved past the tape head, the state of magnetization of the magnetic medium immediately adjacent to the write element is changed. The current into the write element induces a longitudinal magnetization pattern immediately adjacent to the write element forming a track of data. When a track is to be read, a read sensor on the tape head is positioned over the track. The magnetization pattern written on that track radiates flux that is then sensed, or "read," by the read sensor. The read sensor produces a voltage that is symptomatic of the magnetization on the track being read.

Lateral tape motion (LTM) is a topic of special concern to magnetic medium. LTM is the unwanted relative motion of the tape perpendicular to the data tracks. As tracks become narrower in magnetic medium, the allowable tolerance of LTM becomes smaller as well. If LTM is of too great a magnitude, it can cause errors during both reading and writing. During reading, the drive can lose the data track and must try again to read the data. If LTM occurs during writing, there is the possibility of overwriting previously written data.

There are many components in a tape drive that can cause LTM, such as reel or roller flange contact, reel or roller axial/radial run-out, frictional coupling between the head/tape (stick-slip), tape tension transients, and stack jump effect, for example. Stack jump is a phenomenon that occurs during the winding of tape on the take-up reel from the supply tape reel, and when winding tape from the take-up reel back onto the supply tape reel. During winding, wraps of the magnetic medium will slide laterally due to air being trapped between the layers of the magnetic medium, resulting in stack jumps, a condition caused by entrapped air which is due to the boundary layer of air on the moving magnetic medium. The magnetic medium may have a number of these stack jumps since it may be impossible to prevent air from being drawn between the windings of the magnetic medium. As the magnetic medium comes off the reel, the stack jumps cause a 'sudden' lateral displacement of the magnetic medium from a well defined equilibrium position, where the tape impinges upon a reel flange, to another well-defined equilibrium position, where the tape impinges upon the opposite reel flange. This displacement is relatively large, and results in a lateral displacement of the tape over the write element and read sensor by a certain amount, typically tens of microns, which can exceed the buffer zone between data tracks.

Furthermore, the magnetic medium jumps back, in general, to its original lateral position on the pack after a number of revolutions. Stack jumps are repeated in general at the same position each time the magnetic medium is wound. Thus, if a magnetic medium with a stack jump is wound onto another reel, it is likely that the stack jump incidence will be transmitted to the new reel.

Embodiments herein provide for locating data stored on a magnetic medium. A system and method allow the servo controlling a tape head to be informed of lateral shifts such as stack jumps of the magnetic medium and the ability of the servo controller to move the tape head in anticipation of the lateral shifts during the data-write and data-read processes. Embodiments may create a model of the lateral jumps of the magnetic medium as the magnetic medium comes off the supply tape reel in the supply tape reel cartridge during write operations. The model may then be used to better track the motion of the magnetic medium during subsequent read operations and improve the error-recover-procedure (ERP) if a read-error occurs.

Turning now to the figures, FIG. 1 depicts a system 100 for locating data stored on a magnetic medium, consistent with embodiments of the present disclosure. The system 100 may include a servo controller 102 in communication with a linear actuator 106, a supply tape cartridge 114, a supply tape reel rotational servo motor 124, and a take-up reel rotational servo motor 126. The linear actuator 106 which repositions the tape head 108 and the supply tape cartridge 114 are also in communication with one another.

During a write operation, as a magnetic medium 116 comes off of a supply tape reel, the magnetic medium moves across a tape head 108. The servo read sensor 104 provides tracking feedback to servo controller 102, which uses this feedback to reposition tape head 108 via control signals sent by servo controller 102 to linear actuator 106. The servo read sensor 104 reads a timing-based servo 122. The servo read sensor 104 may then measure the longitudinal velocity of the magnetic medium 116 based on non-adjacent, parallel marks in the timing-based servo 122, such as exterior and parallel mark in an italic N, which may be a subset of the entire timing-based servo pattern. The timing-based servo is recorded by the manufacturer of the magnetic medium 116 and it becomes the magnetic-datum in reference to which all data track are written and read. More information on timing-based servo can be found in IBM U.S. Pat. Nos. 5,689,384 and 6,021,013; both entitled Timing Based Servo System for Magnetic Tape Systems.

The tape head 108 may have a write element 110, such as a metal-in-gap (MIG) thin film (TF) write element, which allows the tape head 108 to write data upon the magnetic medium 116. The tape head 108 may also have a read sensor 112, such as a magneto-resistive (MR) read element, a giant magneto-resistive (GMR) read element, or a tunnel magneto-resistive (TMR) read element, that allows the tape head 108 to read data from the magnetic medium 116. Servo read element 104 may also be a MR, GMR, or TMR read element. As the magnetic medium 116 moves across the tape head 108 and is written to by the write element 110, the magnetic medium 116 may shift laterally, or perpendicular, with respect to the data tracks 128 and the timing-based servo 122. The servo read sensor 104, on the tape head 108, is responsive to the timing-based servo 122. The servo read sensor 104 reads the timing-based servo track 122 and provides lateral position and velocity feedback to servo controller 102. Servo controller 102 then determines how much a linear actuator 106 needs to move the tape head 108 in order to reposition tape head 108 over the data track or data tracks 128 on the magnetic medium 116, currently being written or read. The lateral position determination by servo controller 102 is made by servo read sensor 104 observing the transit time of adjacent marks which are of an opposite-angle, such as servo marks forming the letter V, two of which (one upside down) form the italic N. When the magnetic medium 116 shifts laterally with respect to the data tracks 128 and the timing-based servo 122, the servo read sensor 104 reads the timing-based servo 122 and sends feedback to servo controller 102. Servo controller 102 then sends control signals to linear actuator 106 to shift the tape head 108 to the position that the magnetic medium 116 has shifted. The feedback from servo read sensor 104 due to these lateral shifts may then be recorded along the y-axis, and the longitudinal position along the length of the magnetic medium 116 may be recorded along the x-axis, as shown in graph 200 of FIG. 2.

In certain embodiments, servo controller 102 may store the feedback from servo read sensor 104 in a non-volatile store medium 138, such as a cartridge memory. More information about cartridge memories can be found in IBM U.S. Pat. No. 6,304,416, entitled Two Axis Reading of Memory Chip in Cartridge. Within the non-volatile store medium 138 may be a stack jump record 120. The lateral and longitudinal positions measured by the servo read sensor 104 may be stored in the stack jump record 120 by servo controller 102. Stack jumps are generally significantly larger shifts in the lateral position of the magnetic medium 116 when compared to other lateral shifts of the magnetic medium 116, such as the smaller oscillatory lateral motion of the tape caused by reel-wobble. The servo read sensor may be capable of recording all of the lateral shifts of the magnetic medium 116 and sending the recorded lateral shifts to be stored in the stack jump record 120. However, in another embodiment, the servo read sensor 104 may only send the larger shifts in the magnetic medium 116 caused by the stack jumps to be stored in the stack jump record 120. Furthermore, in some embodiments, the servo read sensor 104 may send the recorded positions to be stored on a different non-volatile storage medium 118, such as a succeeding header of data on the magnetic medium 116 being written to by the write element 110 of the tape head 105. In others, the recorded positions may be sent to a trailer of the data on the magnetic medium 116 being written to by the write element 110. Additionally, the recorded positions may be sent to the cartridge memory, the succeeding header of data on the magnetic medium 116, and the trailer of the data on the magnetic medium 116.

Consistent with certain embodiments, when the data-recording portion of magnetic medium has moved completely from the supply tape reel across the tape head 108 and onto a take-up reel, the servo read sensor 104 may provide feedback to the servo controller 102 on the lateral and longitudinal positions of the magnetic medium 116. The servo controller 102 may then record this feedback in an internal memory and subsequently send the recorded positions to be stored within the stack jump record 120. As discussed herein, stack jumps are generally repeated at the same positions each time the magnetic medium 116 is wound. Therefore, the stack jumps may occur again, coming off the take-up reel as they did coming off the supply tape reel. When the magnetic medium is to be read, the servo controller 102 may receive the stack jump record 120 from the non-volatile store medium 118 or 138. The servo controller 102 may read the stack jump record 120, and based upon the stack jump record 120, move the tape head 108, via the linear actuator 106, in anticipation of a sudden shift in the lateral movement of the magnetic medium 116.

For example, when the data that was written to the magnetic medium 116 is to be read, it is once again moved across the tape head 108. The servo controller 102 may receive the stack jump record 120 and read where the magnetic medium 116 experienced a stack jump during the write operation. When a stack jump is going to occur, the servo controller 102 may then determine how much the linear actuator 106 needs to move the tape head 108 in order to reposition the tape head 108 in anticipation of the stack jump. The linear actuator 106 may have a coarse actuator to track large-scale tape motion in series with a fine actuator to track small-scale tape motion, all in the lateral direction. When the tape head 108 is at the correct position, it may then use the read sensor 112 to read the written data and avoid read-errors.

In an alternate embodiment, if additional data is being written to the magnetic medium, it may move across the tape head 108 once again. The servo controller 102 may receive the stack jump record 120 and read where the magnetic medium 116 experienced a stack jump during the first write operation. When a stack jump is going to occur, the servo controller 102 may then determine how much the linear actuator 106 needs to move the tape head 108 in order to reposition the tape head 108 in anticipation of the stack jump. In another embodiment, the tape head 108 may avoid using the write element 110 to write additional data in the region of a stack jump because data written in a stack jump region may be hard to read back.

In certain embodiments, the supply tape reel rotational servo motor 124 and the take-up reel rotational servo motor 126 rotational servo motor may be capable of increasing or decreasing the longitudinal velocity at which the magnetic medium 116 comes off the supply tape reel and onto the take-up reel. This longitudinal velocity is often called the recording velocity or I/O velocity of the magnetic medium 116. The supply tape reel rotational servo motor 124 and the take-up reel rotational servo motor 126 are typically brushless DC servo motors which rotate the supply tape reel inside the supply tape cartridge 114 and the take-up reel inside a take-up reel cartridge.

For instance, when a stack jump may occur, the servo controller 102 may instruct the supply tape reel rotational servo motor 124 and the take-up reel rotational servo motor 126 to decrease the longitudinal velocity that the magnetic medium 116 is coming off of the supply tape reel and onto the take-up reel. The supply tape reel rotational servo motor 124 and the take-up reel rotational servo motor 126 may then lower the RPM (rotations per minute) of supply tape reel and the take-up reel. This may give the linear actuator 106 more time to move tape head 108 when the magnetic medium 116 moves laterally from a stack jump and the tape head 108 may, therefore, be better able to follow the magnetic medium 116. The servo controller 102 then determine how much the linear actuator 106 needs to move the tape head 108 in order to reposition the tape head 108 in anticipation of the stack jump. When the tape head 108 is at the correct position, it may then use the read sensor 112 to read the written data and avoid read-errors. Furthermore, if additional data is being written to the magnetic medium 116, the tape head 108 may avoid using the write element 110 to write additional data in the region of a stack jump.

Figure 2:
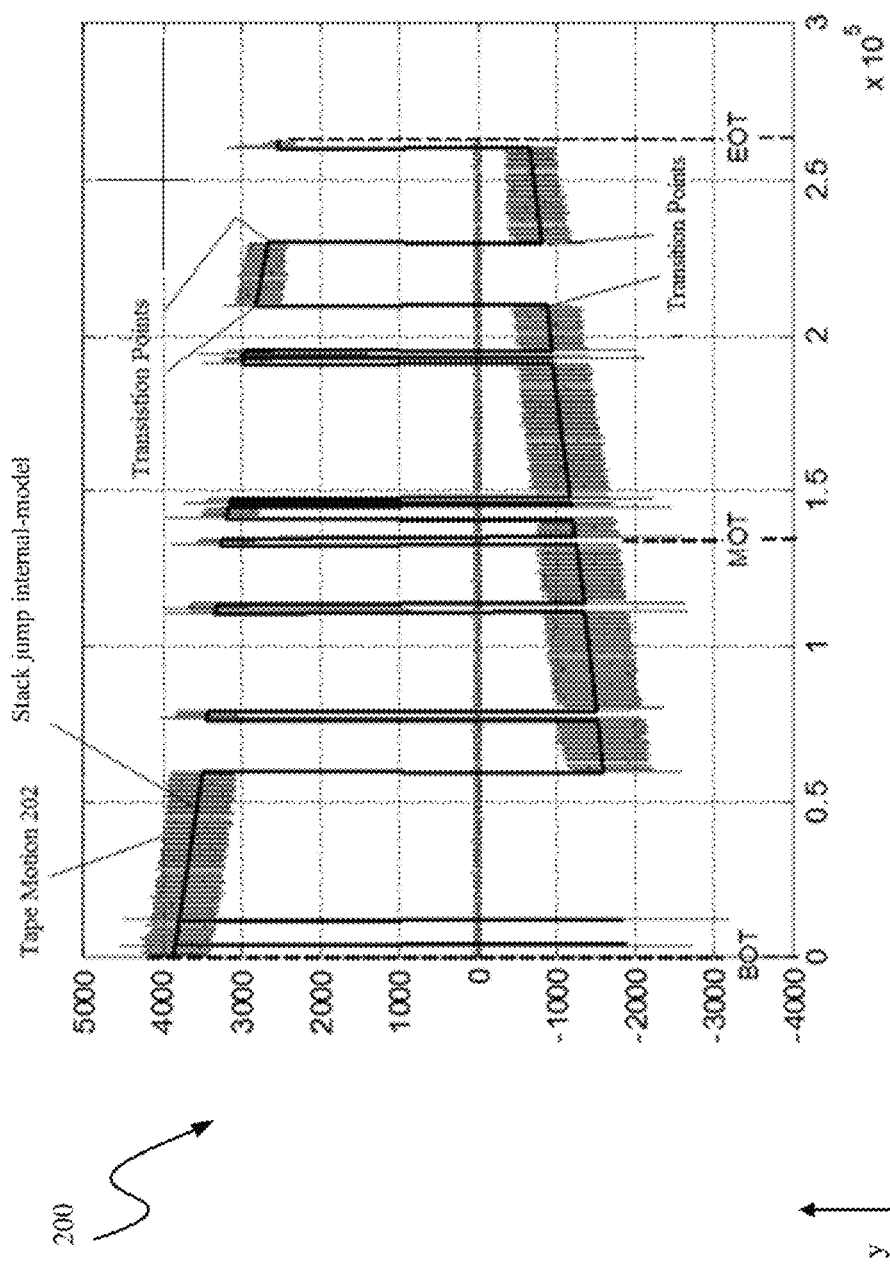
FIG. 2 depicts a recording of the lateral and longitudinal positions of a magnetic medium as it moves from a supply tape reel and onto a receiving tape take-up reel, consistent with embodiments of the present disclosure.

FIG. 2 depicts a graph 200 of a stack jump record 108, from FIG. 1, of the lateral and longitudinal positions of a magnetic medium 116, from FIG. 1, as it moves from a supply tape reel and onto a take-up reel, consistent with embodiments of the present disclosure. The x-axis represents the longitudinal positions along the length of the magnetic medium 116, which are parallel to the data tracks 128 and timing-based servo 122. The y-axis represents the lateral positions of the magnetic medium 116, which are perpendicular to the data tracks and timing-based servo 122. Furthermore, BOT marks the longitudinal beginning of the recording zone of magnetic medium 116, MOT marks the longitudinal middle of the recording zone on magnetic medium 116, and EOT marks the longitudinal end of the recording zone on magnetic medium 116, with respect to the supply tape cartridge 114, from FIG. 1.

The graph 200 may have a tape motion 202 of magnetic medium. The tape motion 202 may show every lateral position of the magnetic medium 116 with respect to its linear position. The lateral positions may include the large-scale stack jumps and the small-scale oscillatory motion of the tape caused by reel-wobble (the axis of spin of the supply and take-up reels not being parallel). There may be multiple relatively small oscillatory-shifts in the lateral position of the magnetic medium 116, the frequency of these oscillatory-shifts is a function of the RPM of the supply reel rotational servo motor 124, from FIG. 1 and there are also larger shifts in the lateral position of the magnetic medium 116. These larger shifts are the stack jumps that are repeated by the magnetic medium 116 when it comes off of the supply tape reel and onto the take-up reel. Every magnetic medium 116 may have a unique stack jump pattern and every magnetic medium 116 may have a unique stack jump record 120 showing where its stack jumps occur. Furthermore, the graph 200 may have a stack jump internal-model 204. The stack jump internal-model 204 may filter out the relatively small oscillatory-shifts of the magnetic medium 116 and leave in the relatively larger shifts due to the stack jumps. As discussed herein, the stack jump internal-model 204 may be the record that is sent to and recorded on the stack jump record 120. The stack jump internal-model 204 may then be read by the servo controller 102, from FIG. 1, and the servo controller 102 may pre-position the tape head 108, from FIG. 1, in anticipation of a stack jump that is going to occur. In conjunction with feedback from servo read sensor 104, servo controller 102 may then determine how much the linear actuator 106, from FIG. 1, needs to move the tape head 108, in order to reposition the tape head 108 in anticipation of the stack jump. However, in another embodiment, the entire tape motion 202, including the oscillatory-shifts and stack jumps, may be sent to and stored in the stack jump record 120 and subsequently read by the servo controller 102.

Figure 3:
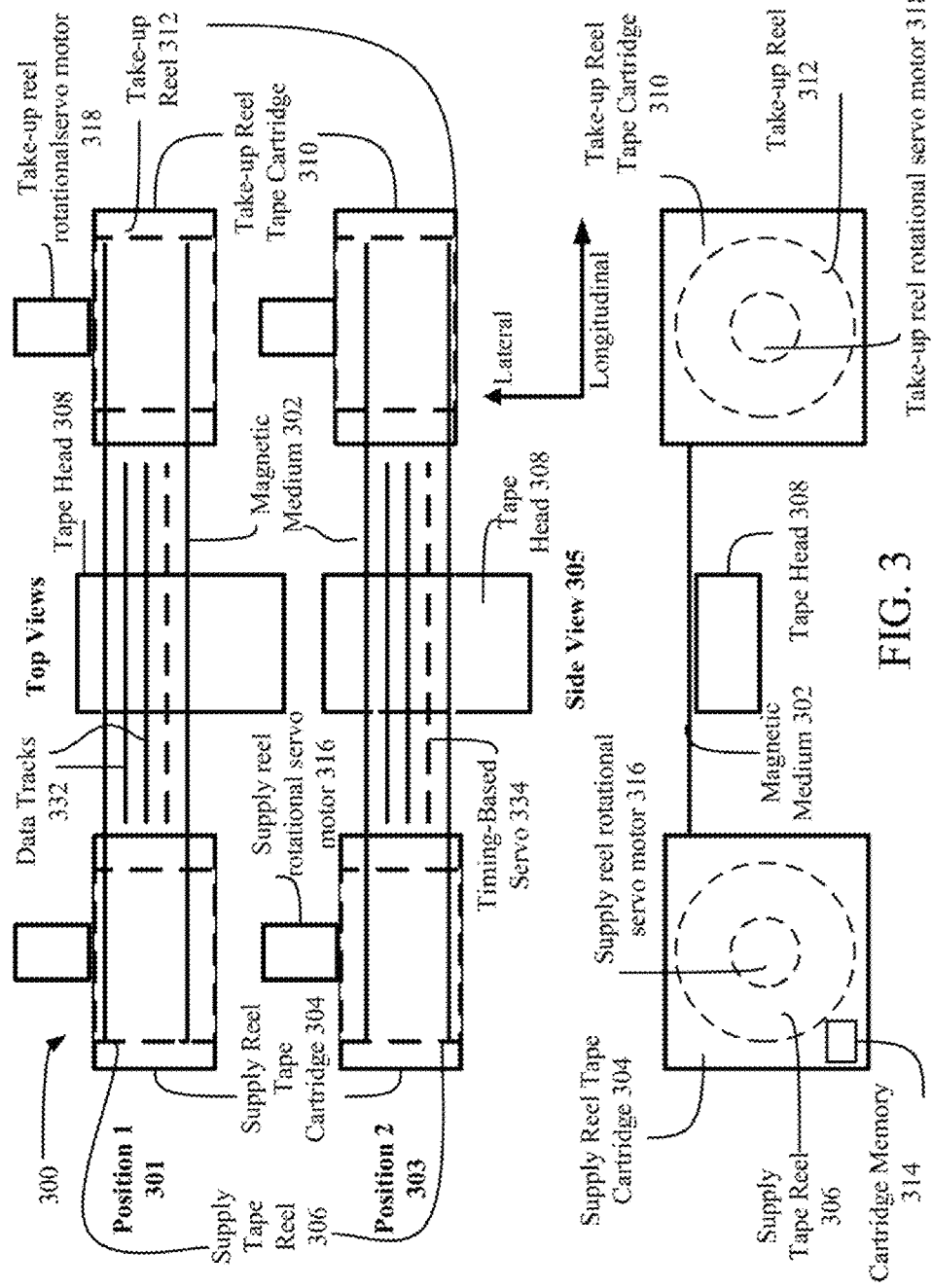
FIG. 3 depicts a position 1 top view, a position 2 top view, and a side view of a magnetic medium coming off a supply tape reel and onto a take-up reel, consistent with embodiments of the present disclosure.

FIG. 3 depicts a position 1 top view 301, a position 2 top view 303, and a side view 305 of a magnetic medium 302 coming off a supply tape reel 306 and onto a take-up reel 312, consistent with embodiments of the present disclosure. As seen from the side view 305, the supply tape reel tape cartridge 304 may contain a supply tape reel 306 where the magnetic medium 302 comes off. As seen from the position 1 top view 301, the magnetic medium 302 may come off the supply tape reel 306 and be located at position 1 301, relative to the center of the supply tape reel 306. The magnetic medium 302 may move across the tape head 308 and be written to by the write element 110, from FIG. 1, on the tape head 308. The magnetic medium 302 may then move onto the take-up reel 312. In an alternate embodiment, take-up reel 312 is optionally located in the receiving tape reel cartridge 310. As seen from the position 2 top view 303, the magnetic medium 302 may continue to come off the supply tape reel 306 and shift to position 2 303 relative to the center of the supply tape reel 306. The magnetic medium 302 may move across the tape head 308 and continue to be written to by the write element 110 of the tape head 308 and then move onto the take-up reel 312. Supply reel 306 is rotated by supply reel rotational servo motor 316 and take-up reel 310 is rotated by take-up reel rotational servo motor 318. The supply reel rotational servo motor 316 and the take-up reel rotational servo motor 318 are controlled by servo controller 102 to move magnetic medium 302 with data tracks 332 longitudinally across the tape head 308 at a consistent recording velocity. This consistent recording velocity is maintained by the servo read sensor 104, from FIG. 1, reading the timing-based servo 334 and thus providing velocity feedback to the servo controller 102, from FIG. 1.

As discussed herein, the stack jump record 120, from FIG. 1, may be sent to and stored on a cartridge memory 314 which is inside of supply tape reel cartridge 304 and read by the servo controller 102, from FIG. 1. When the magnetic medium 302 is to be read, the lateral and longitudinal position may be read from the stack jump record 120 in the cartridge memory 314. When the magnetic medium 302 comes off the supply tape reel 306 to be read, the magnetic medium 302 may make the same lateral movements at the same longitudinal positions as it did when it came off the supply tape reel 306 during the write operation. This may allow the tape head 305 to be moved in anticipation of the magnetic medium 302 moving from position 1 301 to position 2 303. Additionally, the velocity at which the magnetic medium 302 is coming off of the supply tape reel 306 and onto the take-up reel 312, may be decreased in anticipation of the magnetic medium 302 moving from position 1 301 to position 2 303. This may give the tape head 308 more time to move and follow the magnetic medium 302.

Figure 4:
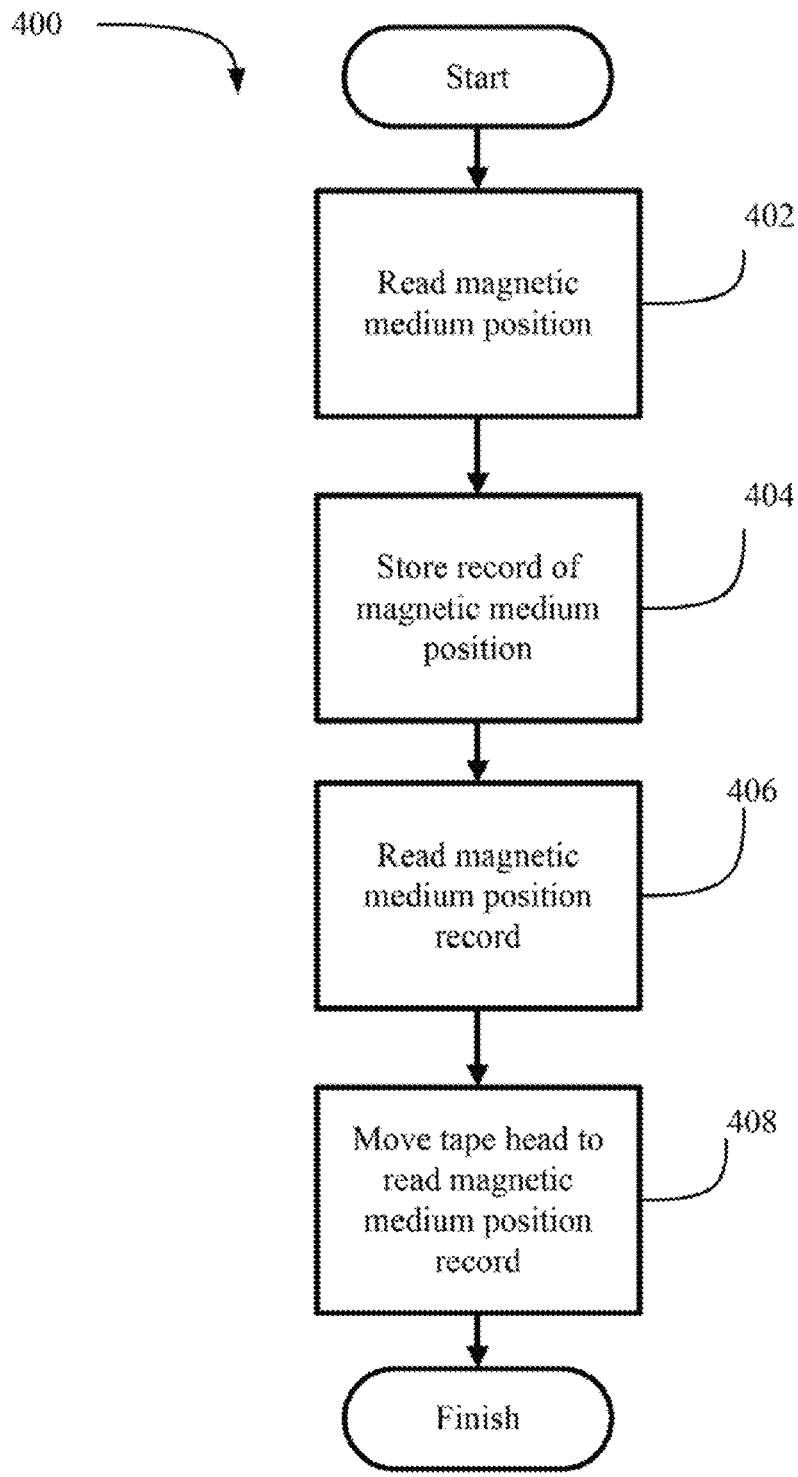
FIG. 4 depicts a high-level method for locating data stored on a magnetic medium, consistent with embodiments of the present disclosure.

FIG. 4 depicts a high-level method 400 for locating data stored on a magnetic medium, consistent with embodiments of the present disclosure. During a data-write, the magnetic medium 116, from FIG. 1, may move laterally, or perpendicular with respect to the data tracks 332 and the timing-based servo 334, as it comes off a supply tape reel 306, from FIG. 3. Concurrently, as the magnetic medium 116 is written to, the lateral position of the magnetic medium may be read at operation 402 and recorded at operation 404. Each position of the magnetic medium 116 may be recorded until the magnetic medium 116 has reached EOT and further unspooling of tape from the supply tape reel 306 and onto a take-up reel 312, from FIG. 3, is halted to prevent the magnetic media from unspooling entirely from the supply tape reel 306. The record of the position may be recorded on a non-volatile storage medium 138, from FIG. 1, such as a cartridge memory 314, or the succeeding headers of data that is being written to the non-volatile memory 118, from FIG. 1, on the magnetic medium 116, or the succeeding trailers of data that is being written to the non-volatile memory 118 on the magnetic medium 116, or all three.

Consistent with certain embodiments, when the positions have been recorded, a servo controller 102, from FIG. 1, may read the record of the positions of the magnetic medium 116 when the magnetic medium 116 came off the supply tape reel 306 in operation 406. Furthermore, the record may only have the positions of when the magnetic medium 116 experienced a stack jump, however, the record may have all of the lateral shifts of the magnetic medium 116 as it came off the supply tape reel 306. As the magnetic medium 116 data is being read, the tape head 108 may concurrently be move by linear actuator 106 in operation 408 in anticipation of the lateral shift of the magnetic medium 116. The velocity at which the magnetic medium 116 is coming off of the supple tape reel 306 and onto the take-up reel 312 may also be decreased by the servo controller 102 to give the linear actuator 106 adequate time to move tape head 108 if the magnetic medium 116 is about to shift laterally. This may limit the amount of read-errors that occur when the tape head 108 is reading the data stored on the magnetic medium 116. Furthermore, if additional data is being written to the magnetic medium 116, the tape head 108 may avoid using the write element 110 to write additional data in the region of a stack jump.

Figure 5:
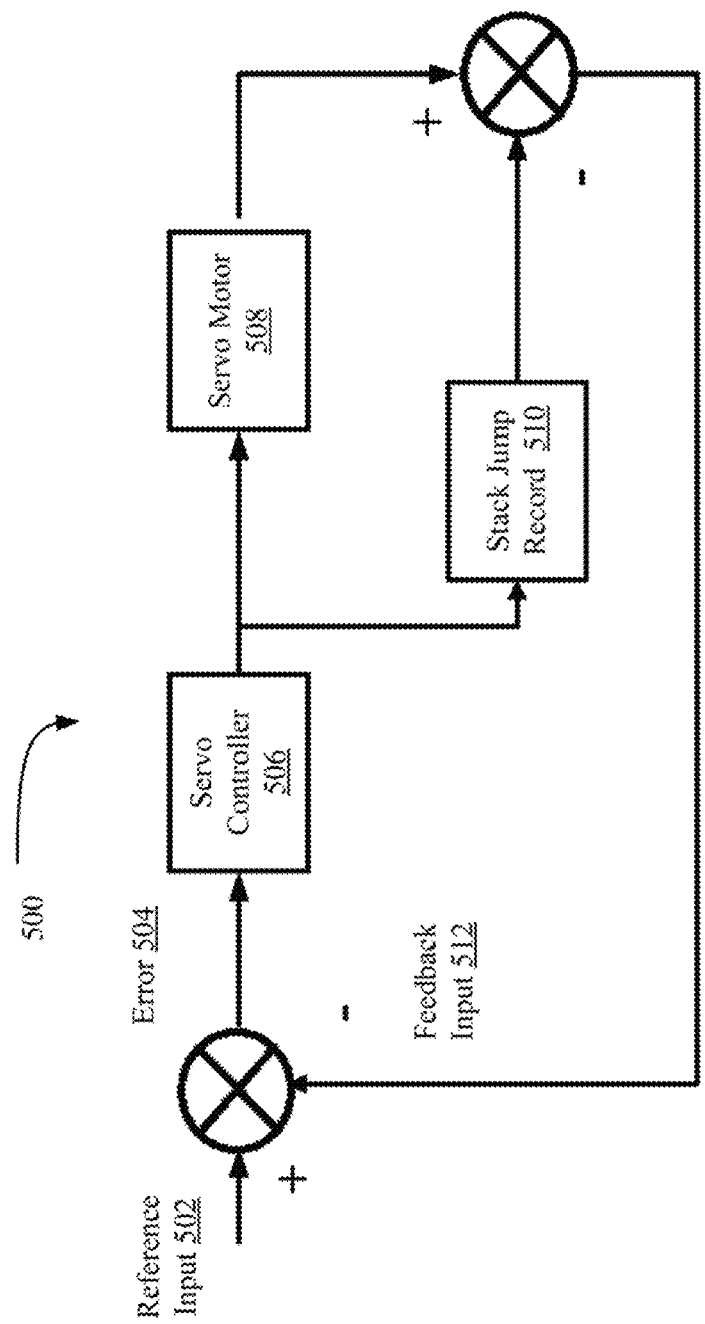
FIG. 5 depicts a control loop for locating data stored on a magnetic medium, consistent with embodiments of the present disclosure.

FIG. 5 depicts a negative-feedback control system 500 depiction for locating data stored on a magnetic medium, consistent with embodiments of the present disclosure. A control system 500 is a device that manages, commands, directs, or regulates the behavior of other devices or systems. The system 500 may include a reference input 502, an error 504, a controller 506, a servo motor 508, a stack jump record 510, and a feedback input 512.

Proportional negative-feedback systems are based on the difference between the reference input 502 and the feedback input 512. This difference is called error 504. The servo controller 506, such as servo controller 102, from FIG. 1, receives the error 504 and determines that a stack jump is going to occur. Power, controlled by servo controller 506, may be applied to servo motor 508, such as linear actuator 106, from FIG. 1, in direct proportion to the measured error 504 so as to reduce the error 504. The power may be supplied to the linear actuator 106, from FIG. 1, to move the tape head 108, from FIG. 1, in order to reposition the tape head 108 in anticipation of the stack jump and correct for the measured error. Furthermore, the servo controller 506 may diminish the power supplied to the supply reel rotational servo motor 124, from FIG. 1, and the take-up reel rotational servo motor 318 in order to decrease the velocity at which the magnetic medium 116, from FIG. 1, comes off the supply tape reel 306, from FIG. 3, and onto the take-up reel 312, from FIG. 3. This may give the tape head 108 more time to move in anticipation of the stack jump and correct for the measured error.

The control system 500 can be understood if the stack jump record 510 is initially absent from the control system 500. The reference input 502 notifies the servo controller 506 of the location of the track that is to be read. The servo controller 506 may then inform the servo motor 508 of the location of the track that was given by the reference input 502. The tape head 108 may then read the track. However, as discussed herein, the magnetic medium moves laterally when being written to by write element 118, from FIG. 1, of tape head 108. Stack jumps are relatively large lateral movements that generally repeat at the same location for a given magnetic medium 116, from FIG. 1, wound on a reel. When a stack jump occurs, the location of the track being read may change laterally, relative to the location of the track given by the reference input 502.

By recording the stack jumps, a stack jump record 510 can be made that can correct for these lateral changes and the tape head 116 can move to the correct position to read the track. For instance, while reading a track, the reference input 502 believes the track is located at a zero reference position. However, based on the information obtained while writing the track, it was observed that the magnetic medium 116 experiences a stack jump at that location, therefore, the track is located 5 micrometers below where the reference input 502 believes.

From this information, the stack jump record 510 can be created and placed in the control system 500. The stack jump record 510 may know that the track is located 5 micrometers below the reference input 502 position and send a 5. The reference input 502, believing the track to be at zero, may input a zero. The 5 may be sent to a first summing point where it is subtracted from zero, therefore, a negative 5 is sent, as the feedback input 512, to the second summing point. The input of zero, from the reference input 502, is at the second summing point with the feedback input 512 of negative 5. The feedback input 512 of negative 5 may be subtracted from the reference input 502 of zero and an error 504 of 5 is given to the servo controller 506. The servo controller 506, which may have the responsibility of bringing the error 504 to zero, recognizes that the error 504 is 5. The servo controller 506 may interpret this to mean that the tape head 108 is 5 micrometers too high to read the track. The servo controller 506 may then inform the servo motor 508 that the tape head is 5 micrometers too high and power may be applied to the servo motor 508 in direct proportion to the measured error 504 so as to reduce the error 504. The power may be supplied to the linear actuator 106, from FIG. 1, to move the tape head 108, from FIG. 1, in order to reposition the tape head 108 in anticipation of the stack jump and correct for the measured error. Furthermore, the power may decrease the velocity at which the magnetic medium 116 comes off the supply tape reel 306 and onto the take-up reel 312, giving the tape head 108 more time to move in anticipation of the stack jump and correct for the measured error.

While the invention has been described with reference to specific embodiments thereof, those skilled in the art will be able to make various modifications to the described embodiments without departing from the true spirit and scope of the embodiments. The terms and descriptions used herein are set forth by way of illustration only and are not meant as limitations. Those skilled in the art will recognize that these and other variations are possible within the spirit and scope of the embodiments as defined in the following claims and their equivalents.

The invention claimed is:

1. A method of locating data stored on a magnetic medium tape that has a beginning longitudinal position with respect to a beginning of the magnetic medium and a lateral position with respect to a first tape reel, the method comprising:
    performing a first unwinding of the magnetic tape from a first tape reel;
    reading a set of lateral positions of the magnetic medium tape with respect to the first tape reel and a concurrent corresponding set of longitudinal positions of the magnetic medium tape with respect to a beginning of the magnetic medium tape as the magnetic medium comes off the first tape reel during the first unwinding;
    determining that one or more of the read lateral positions read during the first unwinding exceeds a buffer zone between data tracks of the magnetic tape;
    storing a record, on a non volatile storage medium, of the one or more set of lateral positions of the magnetic medium tape and a corresponding set of the concurrent corresponding set of longitudinal positions of the magnetic medium tape;
    winding the magnetic tape on to a second tape reel;
    performing a second unwinding of the magnetic tape from the second tape reel;
    reading the record of the one or more set of lateral positions of the magnetic medium tape and the corresponding set of the set of concurrent corresponding longitudinal positions of the magnetic medium tape as the magnetic medium comes off a second tape reel during the second unwinding; and
    moving a tape head laterally during the second unwinding to the lateral positions in response to the reading of the record of the one or more set of lateral positions of the magnetic medium tape and the corresponding set of the set of concurrent corresponding longitudinal positions of the magnetic medium tape.

2. The method of claim 1, further comprising:
    reducing a velocity at which of the second unwinding of the magnetic tape medium comes off the tape reel in anticipation of moving the tape head laterally to the lateral positions in response to the reading of the record of the one or more set of lateral positions of the magnetic medium tape and the corresponding set of the set of concurrent corresponding longitudinal positions of the magnetic medium tape.

3. The method of claim 1, wherein the recording of lateral positions stored on the non volatile storage medium are the positions where a lateral shift due to a stack jump occurs performing of the winding the magnetic tape on to the second tape reel is performed concurrently with the first unwinding of the magnetic tape from the first tape reel.

4. The method of claim 1, wherein the record is stored on non volatile storage medium is a cartridge memory.

5. The method of claim 1, wherein the record is stored on non volatile storage medium is a succeeding header of data on the magnetic medium tape.

6. The method of claim 1, wherein the record is stored on non volatile storage medium is a trailer of data on the magnetic medium tape.

7. The method of claim 1, wherein the first and second tape reels are the same tape reel and the winding of the magnetic tape on to the second tape reel is a winding of the magnetic tape back on to the first tape reel performed subsequent to the first unwinding of the magnetic tape from the first tape reel.

8. A system of locating data stored on a magnetic medium tape that has a beginning longitudinal position with respect to a beginning of the magnetic medium and a lateral position with respect to a first tape reel, the system comprising:
    a recording tool configured to:
        read a set of lateral positions of the magnetic medium tape with respect to the a first tape reel and a concurrent set of corresponding longitudinal positions of the magnetic medium tape with respect to the a beginning of the magnetic medium tape as the magnetic medium comes off the first tape reel during a first unwinding;
        determine that one or more of the read lateral positions read during the first unwinding exceeds a buffer zone between data tracks of the magnetic tape;
    a non-volatile storage medium configured to:
        store a record of the one or more set of lateral positions of the magnetic medium tape and a corresponding set of the concurrent corresponding set of longitudinal positions of the magnetic medium tape; and
    a controller configured to:
        perform the first unwinding of the magnetic tape from the first tape reel;
        wind the magnetic tape on to a second tape reel;
        perform a second unwinding of the magnetic tape from the second tape reel;
        read the record of the one or more set of lateral positions of the magnetic medium tape and the corresponding set of the set of concurrent corresponding longitudinal positions of the magnetic medium tape as the magnetic medium comes off a second tape reel during the second unwinding; and move a tape head laterally during the second unwinding to the lateral positions in response to the reading of the record of the one or more set of lateral positions of the magnetic medium tape and the corresponding set of the set of concurrent corresponding longitudinal positions of the magnetic medium tape.

9. The system of claim 8, wherein the controller is further configured to:

decrease reduce a velocity at which of the second unwinding of the magnetic medium tape comes off the tape reel in anticipation of moving the tape head laterally to the lateral positions in response to the reading of the record of the one or more set of lateral positions of the magnetic medium tape and the corresponding set of the set of concurrent corresponding longitudinal positions of the magnetic medium tape.

10. The system of claim 8, wherein the record of lateral positions stored on the non volatile storage medium are the positions where a lateral shift due to a stack jump occurs controller is configured to perform the winding the magnetic tape on to the second tape reel concurrently with the first unwinding of the magnetic tape from the first tape reel.

11. The system of claim 8, wherein the non-volatile storage medium is a cartridge memory.

12. The system of claim 8, wherein the non-volatile storage medium is a succeeding header of data on the magnetic medium tape.

13. The system of claim 8, wherein the non-volatile storage medium is a trailer of data on the magnetic medium tape.

14. The system of claim 8, wherein the first and second tape reels are the same tape reel and the controller is configured to wind the magnetic tape on to the second tape reel and back on to the first tape reel, subsequent to the first unwinding of the magnetic tape from the first tape reel.

15. A device for storing a record of lateral shifts of a magnetic medium tape, the device comprising:

a tape reel;

the a magnetic medium tape configured to have its lateral positions with respect to the tape reel and corresponding longitudinal positions with respect to a beginning of the magnetic tape, read during a first unwinding from said tape reel, and further adapted to be re-wound on to the tape reel after said first unwinding;

a non-volatile storage medium for storing configured to store a record of a set of one or more of the lateral positions of the magnetic medium tape and a corresponding set of concurrent set of the corresponding longitudinal positions of the magnetic medium tape read during the first unwinding from said tape reel, and further configured to have the record of the one or more lateral positions of the magnetic tape and the corresponding set of the corresponding longitudinal positions of the magnetic tape, read during a second unwinding of the re-wound magnetic tape from the tape reel; and a tape reel cartridge configured to store the tape reel and the magnetic tape.

16. The device of claim 15, wherein the non-volatile storage medium is a cartridge memory stored on the tape reel cartridge.

17. The device of claim 15, wherein the non-volatile storage medium is a succeeding header of data on the magnetic medium tape.

18. The device of claim 15, wherein the non-volatile storage medium is a trailer of data on the magnetic medium tape.

19. The device of claim 15, wherein the set of lateral positions of the magnetic medium and the concurrent set of longitudinal positions of the magnetic medium are due to stack jumps magnetic tape is wound on the tape reel.

* * * * *